United States Patent [19]

Schiel et al.

[11] Patent Number: 5,080,136
[45] Date of Patent: Jan. 14, 1992

[54] VALVE ARRANGEMENT

[75] Inventors: Lothar Schiel, Hofheim; Manfred Rueffer, Sulzbach; Christoph Jung, Eppstein; Thomas Schuster, Huenstetten, all of Fed. Rep. of Germany

[73] Assignee: Alfred Teves GmbH, Frankfurt Am Main, Fed. Rep. of Germany

[21] Appl. No.: 594,212

[22] Filed: Oct. 9, 1990

[30] Foreign Application Priority Data

Oct. 27, 1989 [DE] Fed. Rep. of Germany ....... 3935812

[51] Int. Cl.$^5$ ........................................... F16K 31/128
[52] U.S. Cl. ........................ 137/625.64; 137/627.5
[58] Field of Search ...................... 137/627.5, 625.64

[56] References Cited

U.S. PATENT DOCUMENTS

| | | | |
|---|---|---|---|
| 3,188,148 | 6/1965 | Eaton | 137/625.64 X |
| 3,907,379 | 9/1975 | Lawson | 137/627.5 X |
| 3,945,401 | 3/1976 | Greenwood | 137/627.5 |
| 4,919,168 | 4/1990 | Wagner | 137/627.5 |

*Primary Examiner*—Robert G. Nilson
*Attorney, Agent, or Firm*—Robert P. Seitter; J. Gordon Lewis

[57] ABSTRACT

A valve arrangement has a housing in which are arranged an electromagnetically actuatable pilot valve controlling a differential pressure and a main valve actuatable by the differential pressure, the closure member of the main valve permitting a connection to be established between an outlet port and, alternatively, a first or a second inlet port. In order to keep the overall length of the valve arrangement as small as possible, the present invention provides a joint axis (29) of the pilot valve (5) and of the electromagnet (6) actuating the pilot valve (5) which is perpendicular to the axis (30) of the main valve (7) in a plane that is radially offset relative to the axis (30). In the inactive position, both compartments (23, 24) are exposed to the higher pneumatic pressure.

20 Claims, 2 Drawing Sheets

VALVE ARRANGEMENT

TECHNICAL FIELD

The present invention relates to a valve arrangement including a housing in which is arranged an electromagnetically actuatable pilot valve. The pilot valve controls a pneumatic differential pressure and has two sealing seats, which are coaxial and axially offset relative to one another, and a closure member. The valve arrangement also includes a main valve which is actuated by the differential pressure and has two sealing seats, which are coaxial and axially offset relative to one another, and a closure member. The closure member of the main valve is operated by a movable diaphragm wall to which the differential pressure applies and which is biassed by a resetting spring. That closure member controls the connection between an outlet port and, alternatively, a first or a second inlet port. Both the closure member of the pilot valve and that of the main valve are formed by an elastic, rotationally symmetric valve member which is biassed toward the two sealing seats. The diaphragm wall isolates two pneumatic chambers in the housing.

BACKGROUND OF THE INVENTION

A similar valve arrangement is known from German published patent application 37 39 337, for example. In this known valve arrangement, the pilot valve including the electromagnet, the diaphragm wall, and the main valve has one joint axis of symmetry. The compartments isolated by the diaphragm wall are acted upon by a vacuum in the inactive position. The ports designed on a connecting portion are arranged such that their axes lie in two planes which are in parallel but spaced relationship to each other.

Disadvantages of the known valve arrangement are the overall length, its complicated structure, the large number of pneumatic connections, and the large number of components required.

SUMMARY OF THE INVENTION

Therefore, it is an object of the present invention to improve upon the known valve arrangement by shortening its overall length. At the same time, the assembly is simplified and the number of pneumatic connections is reduced. The valve arrangement is easily and serially manufactured, and it consists of component parts which can be manufactured at low cost so that complicated manufacturing measures can be avoided to a large extent.

This object is achieved according to the present invention by a joint axis of the pilot valve and of the electromagnet actuating the pilot valve which is perpendicular to the axis of the main valve and lies in a plane which is radially offset relative to this axis. Moreover, both compartments are exposed to the effect of the higher pneumatic pressure in the inactive position.

In a particularly compact and space-saving embodiment of the present invention, the housing includes a connecting portion and a mid-portion, and the compartments are designed in a pneumatic chamber which is confined by the mid-portion and a cover portion fastened thereto.

In another embodiment of this invention, which lends itself to ease of assembly, a diaphragm forming a component of the diaphragm wall is clamped between the mid-portion and the cover portion, and that mid-portion and cover portion are in form-fit engagement with one another.

The overall length is further shortened, the assembly is further simplified, or both, in still another embodiment of this invention. A resetting spring biassing the diaphragm wall is arranged in a recess adjacent to the axially inwardly disposed pneumatic chamber and is supported on a disc abutting the bottom of the recess. The disc axially retains a ring seal which seals an actuating tappet in relation to the mid-portion. The tappet transmits the movement of the diaphragm wall to the main valve.

According to another preferred design of this invention, the mid-portion is equipped with elastic stops which cooperate with the diaphragm wall upon actuation of the valve arrangement. This permits the valve arrangement to operate with extremely little noise.

In another preferred embodiment of this invention, the electromagnet is arranged in a cylindrical recess designed in the mid-portion and is retained by two pins which are perpendicular to the axis of the mid-portion. Preferably, the electromagnet has an axial extension containing a radial circumferential groove, the pins are of conical design, and the pins engage the circumferential groove in the assembled condition. These features permit the closing and opening travel distance of the pilot valve to be precisely adjusted, thereby optimizing the response time and the release time of the valve arrangement.

The functional safety of the valve arrangement is enhanced according to a further feature of the invention. A filter element is inserted in front of both the pilot valve and the first inlet port, which port preferably communicates with the atmosphere.

Another feature which further enhances the functional safety is a guide provided on the mid-portion. The guide receives the actuating tappet and its length is such that its end is disposed in the plane containing the sealing surface of the closure member of the main valve. Owing to this feature, the risk of the actuating tappet becoming jammed is largely eliminated.

Finally, shortening of the response time of the pilot valve is attained in yet another embodiment of this invention. The pilot valve plate, carrying a sealing seat of the pilot valve, is movable in a manner free from forces in the initial phase of the actuating movement.

One embodiment of the invention will be described in more detail in the following with references to the accompanying drawings.

DETAILED DESCRIPTION OF THE INVENTION

Figure 1:
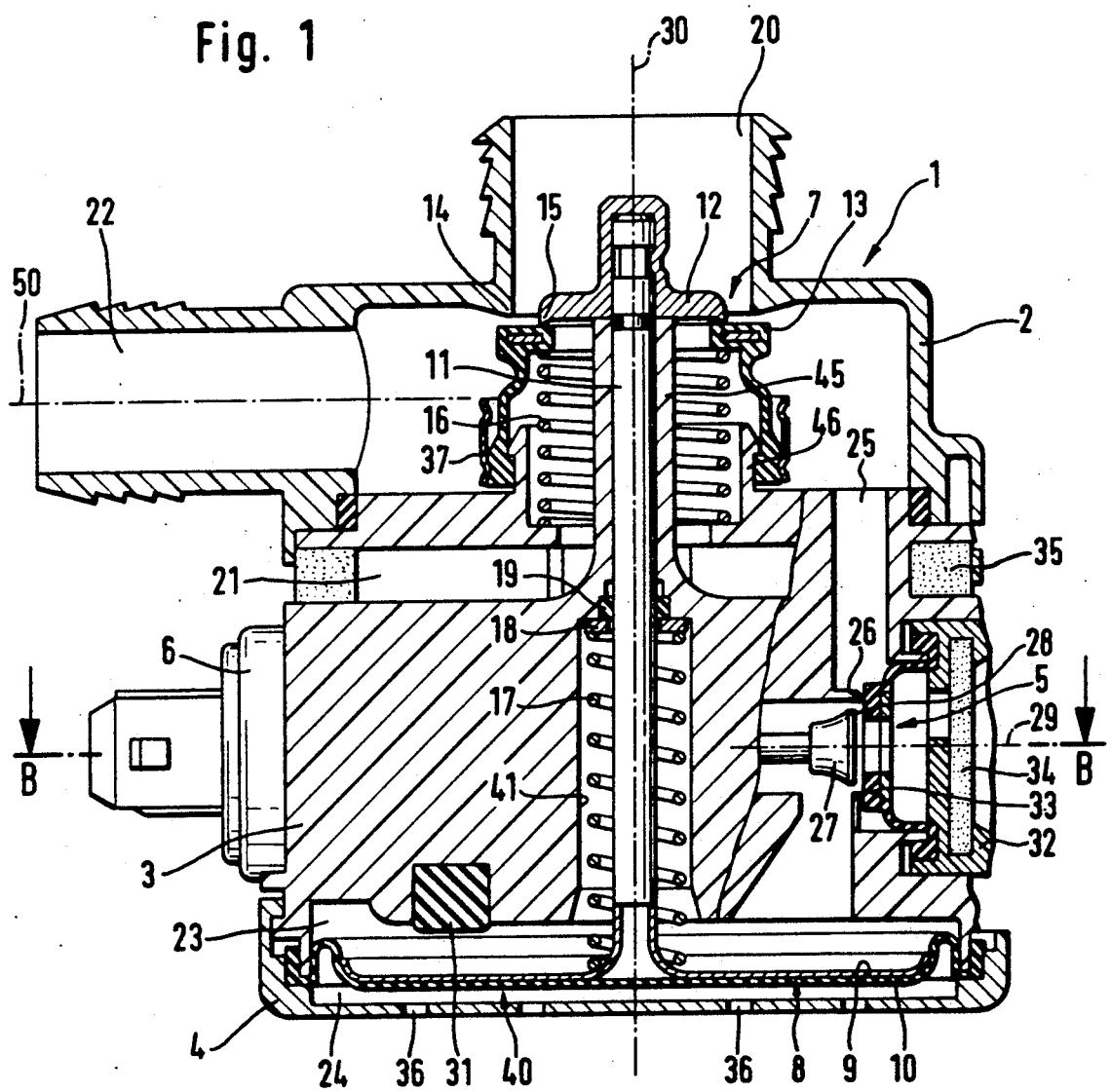
FIG. 1 is a cross-sectional view of the valve arrangement of the present invention, the left half thereof showing the cross-section taken along the line A—A and the right half thereof showing the partial cross-section taken along the line C—C in FIG. 2.
Figure 2:
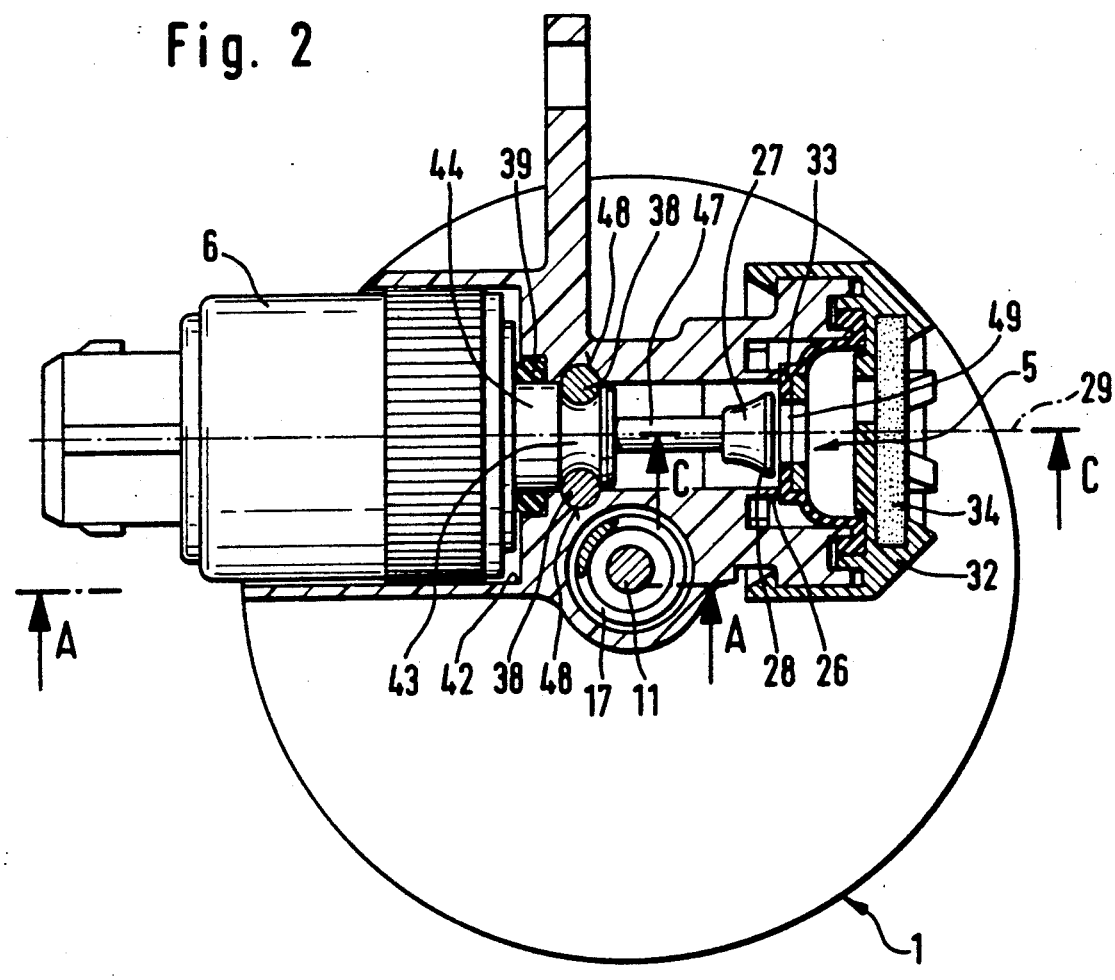
FIG. 2 shows the cross-section taken along the line B—B in FIG. 1.

The valve arrangement illustrated in FIGS. 1 and 2 includes a pilot valve 5 and a main valve 7 arranged in a housing 1 which is subdivided into a connecting portion 2, a mid-portion 3, and a cover portion 4 which, preferably, are interconnected in a form-fit manner.

The connecting portion 2 has a second inlet port or vacuum port 22 and an outlet port 20, the axes of symmetry 50 and 30, respectively, of which are disposed perpendicularly to each other and which are connected in the inactive position of the valve arrangement.

On the axially inwardly disposed end of the outlet port 20, the first annular sealing seat 14 of the main valve 7 is designed in the connecting portion 2. The sealing seat 14 is arranged coaxially relative to a second sealing seat 15 which is provided on a valve plate 12 actuated by an actuating tappet 11. In the inactive position of the valve arrangement, the second sealing seat 15 coacts with a closure member 13 which, preferably, is formed by a rotationally symmetric, elastic element and is biassed by a valve spring 16 toward the two sealing seats 14, 15. The arrangement of the closure member 13 in the housing 1 is preferably chosen such that, on its end remote from the valve plate 12, it is slipped on a cylindrical extension 46 of the mid-portion 3 and is retained by an annular closure member 37. A first inlet port 21 or atmosphere inlet is formed by a plurality of ring segments designed in the mid-portion 3, with a filter element 35 arranged between the ring segments.

The mid-portion 3, together with the cover portion 4, confines at its end remote from the main valve 7 a pneumatic chamber 40 which is subdivided by an axially movable diaphragm wall 8 arranged therein into a first compartment 23, which communicates with the interior of the connecting portion 2, and into a second compartment 24, which is connected to the atmosphere by slots 36 in the cover portion 4. The diaphragm wall 8 includes a diaphragm 10 clamped between the mid-portion 3 and the cover portion 4 and a diaphragm plate 9 which is biassed by a resetting spring 17 and is in force-transmitting engagement with the actuating tappet 11 actuating the main valve 7. Preferably, the resetting spring 17 is arranged in a recess 41 in the mid-portion 3, which recess terminates in the first compartment 23. On the bottom of the recess, the resetting spring 17 is supported by a retaining disc 18 which retains a ring seal 19 sealing the actuating tappet 11 in an annular groove (not shown). Above the recess 41 in the axial direction is a guide 45 in which the actuating tappet 11 is guided and which extends to the plane defined by the sealing surface of the closure member 13 of the main valve 7. The end surface of the mid-portion 3 which defines the first compartment 23 has a plurality of elastic stops 31 against which the diaphragm wall 8 will abut upon actuation. The connection between the first compartment 23 and the interior of the connecting portion 2 and/or the second inlet port 22 occurs through a pneumatic channel 25 which extends in the mid-portion 3 parallel to the actuating direction of the main valve 7. The channel is discernible from the broken-off section view shown in the right-hand half of FIG. 1; it is closed by actuation of the pilot valve 5.

As becomes evident in particular from FIG. 2, the pilot valve 5 includes a first sealing seat 26 which is designed preferably in the mid-portion 3, a second sealing seat 28 designed on a pilot valve plate 27, and a closure member 33 which cooperates with the two sealing seats 26, 28 and which is formed by an elastic, rotationally symmetric sealing element and is attached to the mid-portion by a holding element 32. Via an actuating element 47, the pilot valve plate 27 is in effective engagement with the armature (not shown) of an electromagnet 6 which slides into a cylindrical recess 42 designed in the mid-portion 3. The actuating element 47 is guided slidably in an axial extension 44 of the electromagnet 6 which is furnished with a radial circumferential groove 43 and is sealed in relation to the mid-portion 3 by a ring seal 39. The circumferential groove 43 partly receives two pins 38 which are arranged oppositely in a plane disposed perpendicularly to the axis 29 of the pilot valve 5. The pins 38 are preferably of conical design and fix the electromagnet 6 in the housing 1 upon insertion into corresponding cut-out portions 48 in the mid-portion 3. This permits the distance between the second sealing seat 28 and the closure member 33 of the pilot valve 5 to be precisely adjusted and the response and release times of the valve to be optimized. In order not to impair the functional safety of the pilot valve 5, an annular filter element 34 is arranged in the pilot-valve holding element 32 which effectively prevents the ingress of dirt particles contained in the outside air into the interior of the housing 1. The arrangement of the electromagnet 6 and of the pilot valve 5 in the housing 1 is preferably chosen such that their common axis 29 is perpendicular to the axis 30 of the main valve 7, and in a plane which is radially offset with respect to the axis 30 and is roughly disposed between the end surface of the mid-portion 3, confining the first compartment 23, and the orifice of the pneumatic channel 25.

The electromagnetically actuatable valve arrangement which is designed according to this invention operates as follows.

The second inlet port 22 connects to a vacuum source. When the electromagnet 6 is not excited, the pilot valve 5, the diaphragm wall 8, and the main valve 7 are in the inactive position shown in FIG. 1 so that a connection is established between the second inlet port 22 (vacuum inlet) and the outlet port 20, and the first working chamber 23 connects to the atmosphere via the lower part of the pneumatic channel 25, the open sealing seat 28 of the pilot valve 5, and an opening 49 provided in the holding element 32. Since the second working chamber 24 is in permanent connection with the atmosphere via the slots 36 in the cover portion 4, atmospheric pressure prevails in the two compartments 23, 24, and the diaphragm wall 8 is pressure-balanced.

When voltage is applied to the coil of the electromagnet 6, a force acts on the armature which displaces the actuating element 47 and, respectively, the pilot valve plate 27 coupled thereto toward the closure member 33. When contact is made with the closure member 33, the sealing seat 28 positioned on the pilot valve plate 27 will be closed, whereby the connection between the first compartment 23 and the atmosphere will be interrupted. This closing action is followed directly by lifting of the closure member 33 from the first sealing seat 26, consequently releasing the pneumatic connection between the first compartment 23 and the second inlet port 22 (vacuum inlet) via the channel 25. Evacuation of the aerated first compartment 23 is thus performed so that, due to the differential pressure acting upon the movable diaphragm plate 8, an actuating force is created which is directed upward in the drawing and which is directly proportional to the effective surface of the diaphragm wall 8 and overcomes the resetting force of the resetting spring 17. An upward displacement of the actuating tappet 11 results from the action of the actuating force. That displacement is directly followed by displacement of the biassed closure member 13 of the main valve 7 so that the second sealing seat 15 remains closed during the initial phase of the change-over action.

In an intermediate position subsequent thereto, the first sealing seat 14 will be closed as well, whereupon in the course of further movement the second sealing seat 15 is lifted from the closure member 13. The change-over of the valve arrangement is thereby completed, and a connection exists between the first (atmospheric) inlet port 21 and the outlet port 20. When the voltage applied to the magnet coil is disconnected, the process described hereinabove will be reversed.

As the preceding description indicates, the switching motions of the two valves are independent; therefore, it is possible to use a small electromagnet, since there is need for merely a small, freely selectable stroke which is free from forces in the initial phase and a minor force which can be chosen at will by correspondingly dimensioning the diameter of the pilot valve 27. Moreover, a switch force of the main valve 7 as large as desired is possible, since the size of the movable diaphragm wall 8, too, is freely selectable.

What is claimed is:

1. A valve arrangement comprising:
   a housing having first and second inlet ports and an outlet port;
   a movable diaphragm wall within said housing isolating first and second pneumatic compartments within said housing and movable in response to pneumatic pressure differentials developed between opposite sides of said diaphragm wall;
   a pilot valve within said housing extending along a first axis for developing said pneumatic pressure differentials;
   a main valve within said housing extending along a second axis which is perpendicular in space to said first axis and in a plane which is radially offset from said first axis, said main valve responsive to said movable diaphragm wall for selectively connecting said first and said second inlet ports to said outlet port in response to movement of said diaphragm wall; and
   an electromagnet disposed along said first axis for actuating said pilot valve to develop said pneumatic pressure differentials.

2. A valve arrangement as claimed in claim 1 wherein:
   (a) said pilot valve has:
      (1) a closure member connected to said electromagnet and is movable along said first axis, and
      (2) two sealing seats coaxially aligned and axially movable relative to one another from a position in which said seats are axially offset along said first axis through a position in which said seats are axially aligned along said first axis; and
   (b) said main valve has:
      (1) a closure member connected to said movable diaphragm wall and is movable along said second axis, and
      (2) two sealing seats coaxially aligned and axially movable relative to one another from a position in which said seats are axially offset along said second axis through a position in which said seats are axially aligned along said second axis.

3. A valve arrangement as claimed in claim 2 wherein said housing includes:
   (a) a mid-portion having said first inlet port;
   (b) a connecting portion having said outlet port, said second inlet port, and a first of said sealing seats of said main valve; and
   (c) a cover portion fastened to said mid-portion and forming with said mid-portion a pneumatic chamber in which are disposed said first and said second pneumatic compartments.

4. A valve arrangement as claimed in claim 3 wherein said mid-portion and said cover of said housing are fastened by a form-fit engagement and said movable diaphragm wall includes:
   (a) a diaphragm plate; and
   (b) a diaphragm abutting said diaphragm plate, said diaphragm being clamped between said mid-portion and said cover portion of said housing.

5. A valve arrangement as claimed in claim 3 wherein said outlet port is disposed perpendicular to said second inlet port and said first sealing seat of said main valve is at the axially inner end of said outlet port.

6. A valve arrangement as claimed in claim 5 wherein said main valve further includes a valve plate connected to said movable diaphragm wall and movable within said outlet port, said valve plate forming said second sealing seat of said main valve.

7. A valve arrangement as claimed in claim 2 wherein:
   (a) said first inlet port is connected to the atmosphere;
   (b) said second inlet port is connected to a vacuum source; and
   (c) said first pneumatic compartment is evacuable and communicates with said second inlet port through said pilot valve.

8. A valve arrangement as claimed in claim 5 wherein said mid-portion of said housing has a first cylindrical recess located adjacent to said first compartment and said valve arrangement further includes a resetting spring positioned in said first cylindrical recess, said resetting spring biassing said movable diaphragm wall.

9. A valve arrangement as claimed in claim 8 further including a tappet connecting said valve plate of said main valve and said movable diaphragm wall, a ring seal sealing said tappet in relation to said mid-portion of said housing, and a disc which supports said resetting spring and axially retains said ring seal.

10. A valve arrangement as claimed in claim 9 wherein said closure member of said main valve is operated by said movable diaphragm wall to permit a connection between said outlet port and (a) said first inlet port when said valve arrangement is in an active position, and (b) said second inlet port when said valve arrangement is in an inactive position.

11. A valve arrangement as claimed in claim 10 wherein said closure member of said main valve and said closure member of said pilot valve are elastic and rotationally symmetric and said valve arrangement further includes means for biassing said closure member of said main valve and means for biassing said closure member of said pilot valve.

12. A valve arrangement as claimed in claim 11 further including an elastic stop disposed on said mid-portion of said housing, said stop engaging said movable diaphragm wall upon actuation of said valve arrangement.

13. A valve arrangement as claimed in claim 12 further including a first filter element disposed between said pilot valve and the atmosphere.

14. A valve arrangement as claimed in claim 13 wherein said pilot valve further includes a holding member, said holding member for holding said closure member of said pilot valve and in form-fit engagement with said mid-portion of said housing, said first filter element being positioned in said holding element.

15. A valve arrangement as claimed in claim 14 further including a second filter element disposed between said first inlet port and the atmosphere.

16. A valve arrangement as claimed in claim 2 wherein said housing includes a mid-portion having said first inlet port and a second cylindrical recess within which said electromagnet is positioned and said valve arrangement further includes two pins disposed perpendicular to said first axis for retaining said electromagnet in said second recess.

17. A valve arrangement as claimed in claim 16 wherein said electromagnet has an axial extension having a radial circumferential groove within which said pins are disposed.

18. A valve arrangement as claimed in claim 17 wherein said pins are conical.

19. A valve arrangement as claimed in claim 18 wherein said mid-portion of said housing has a guide within which said tappet is received, the end of said guide disposed in the plane containing the sealing surface of said closure member of said main valve.

20. A valve arrangement as claimed in claim 3 wherein said connecting portion of said housing is in form-fit engagement with said mid-portion of said housing.

* * * * *